United States Patent
Jalkanen et al.

(10) Patent No.: US 11,140,622 B2
(45) Date of Patent: Oct. 5, 2021

(54) ACCESS TO COMMUNICATION SERVICE

(71) Applicant: Telia Company AB, Solna (SE)

(72) Inventors: Tero Jalkanen, Tuusula (FI); Tomi Sarajisto, Helsinki (FI)

(73) Assignee: TELIA COMPANY AB, Solna (SE)

( * ) Notice: Subject to any disclaimer, the term of this patent is extended or adjusted under 35 U.S.C. 154(b) by 27 days.

(21) Appl. No.: 16/675,304

(22) Filed: Nov. 6, 2019

(65) Prior Publication Data

US 2020/0145914 A1 May 7, 2020

(30) Foreign Application Priority Data

Nov. 6, 2018 (FI) .................................. 20185941

(51) Int. Cl.
| | |
|---|---|
| *H04L 29/06* | (2006.01) |
| *H04L 29/08* | (2006.01) |
| *H04W 48/18* | (2009.01) |
| *H04W 8/22* | (2009.01) |
| *H04W 8/26* | (2009.01) |
| *H04W 12/06* | (2021.01) |
| *H04W 60/04* | (2009.01) |
| *H04W 60/06* | (2009.01) |
| *H04W 84/18* | (2009.01) |

(52) U.S. Cl.
CPC ............ *H04W 48/18* (2013.01); *H04W 8/22* (2013.01); *H04W 8/26* (2013.01); *H04W 12/06* (2013.01); *H04W 60/04* (2013.01); *H04W 60/06* (2013.01); *H04W 84/18* (2013.01); *H04M 2215/32* (2013.01)

(58) Field of Classification Search
CPC ......... H04W 48/18; H04W 8/22; H04W 8/26; H04W 12/06; H04W 60/04; H04W 60/06; H04W 84/18; H04W 48/14; H04W 60/00; H04W 8/18; H04W 76/11; H04W 4/50; H04M 2215/32; H04L 67/303; H04L 63/10
See application file for complete search history.

(56) References Cited

U.S. PATENT DOCUMENTS

| | | | |
|---|---|---|---|
| 9,967,801 B2 | 5/2018 | Byun et al. | |
| 2017/0164212 A1* | 6/2017 | Opsenica | ............ H04L 41/0246 |
| 2017/0289791 A1 | 10/2017 | Yoo et al. | |
| 2017/0359768 A1* | 12/2017 | Byun | ...................... H04W 8/06 |
| 2019/0108142 A1* | 4/2019 | Hasida | ...................... H04L 9/08 |

OTHER PUBLICATIONS

FI Search Report, dated Apr. 16, 2019, from corresponding FI application No. 20185941.
European Search Report issued in European Patent Application No. 19 20 6809 dated Mar. 2, 2020.
(Continued)

*Primary Examiner* — Joseph E Dean, Jr.
(74) *Attorney, Agent, or Firm* — Nixon & Vanderhye (57) ABSTRACT

Disclosed is a method for attaching a terminal device to a slice of a mobile communication system for communicating with a remote system. In the method a plurality of inquiries to a plurality of databases is performed for determining if the entities involved in the solution are certified to access the slice of the mobile communication system. Also disclosed is a network node and a computer program.

18 Claims, 3 Drawing Sheets

(56) References Cited

OTHER PUBLICATIONS

Nokia et al., "Network Slice access subscription management by a third party", 3GPP Draft; S2-175693-Sub Man 3rd in 5G-23.501 VI, 3rd Generation Partnership Project (3GPP), Mobile Competence Centre, vol. SA WG2, No. Sophia Antipolis, France; Aug. 21, 2017 (Aug. 21, 2017), XP051325542, Retrieved from the Internet: URL:http://www.3gpp.org/ftp/Meetings_3GPP_SYNC/SA2/Docs/.

"3rd Generation Partnership Project; Technical Specification Group Services and System Aspects; Study on Enhancement of Network Slicing (Release 16)", 3GPP Standard; Technical Report; 3GPP TR23.740, 3rd Generation Partnership Project (3GPP), Mobile Competence Centre, No. V0.6.0, Nov. 1, 2018 pp. 1-68,XP051487725.

\* cited by examiner

ACCESS TO COMMUNICATION SERVICE

TECHNICAL FIELD

The invention concerns in general the technical field of communications. More particularly, the invention concerns a solution for accessing a communication service.

BACKGROUND

Matching between different entities in a communication path is an important aspect in order to provide a seamless communication service between communicating entities. The matching herein refers at least to provision of communication services in accordance with a capability of the terminal device in question. A prerequisite to the matching is that the capability of the terminal device is known. Nowadays, a telecom operatory which typically manages the communication network whose services the terminal device utilizes receives information on the capability of the terminal device from so-called certification authorities and based on the information the telecom operator may control an access, and an operation, of each device in the communication network. In a big picture the above described way to arrange the matching is good in a sense that the telecom operator having a closed environment may control the access of terminal devices to the communication network. However, the closed environment is not optimal especially nowadays, because customers are willing to get communication services for different kinds of terminal devices. Besides, the certification authorities do not analyze all necessary devices, such as so-called niche products, e.g. devices for IoT environment, which results in that the devices do not end up to a list allowed to access to the communication network of a certain telecom operator. Still further, a certification process performed by a certain certification authority does not cover all issues especially when the devices, and their target use, differ due to a great variety of the products. Typically the certification process is only performed from one perspective, such as from analyzing the capabilities of a radio transmission by the device, i.e. not taking into account all aspects relating to the communication, such as user related aspects, network setup related aspects and so on.

Hence, there is need to develop solutions which mitigate, at least in part, the above-mentioned drawbacks of the prior art solutions and provide a way to improve the matching between terminal devices and modern communication networks.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a network node and a computer program product for attaching a terminal device to a communication system.

The objectives of the invention are reached by a method, a network node and a computer program product as defined by the respective independent claims.

According to a first aspect, a method for attaching a terminal device to a slice of a mobile communication system for communicating with a remote system is provided, the method comprises: receiving, by an access management function, an attachment request to the slice of the mobile communication system from the terminal device; generating an inquiry to a first database storing data indicating if the terminal device is certified to access the slice of the mobile communication system, the generated inquiry comprising an identifier of the terminal device; receiving a first response from the first database; generating an inquiry to a second database storing data indicating if the mobile communication system is capable of providing a communication service to the slice for establishing a communication between the terminal device and the remote system; receiving a second response from the second database; in response to a detection that the first response comprises data indicating that the terminal device is certified to access the slice of the mobile communication system and the second response comprises data indicating that the mobile communication system is capable of providing a communication service to the slice for establishing the communication between the terminal device and the remote system attaching the terminal device to the slice of the mobile communication system for communicating with the remote system.

The method may further comprise, prior to attaching the terminal device to the slice of the mobile communication system: determining, by the access management function, if an end-user certification is needed for attaching the terminal device to the slice of the mobile communication system. In response to a detection that the end-user certification is needed, the method may further comprise steps of: generating an inquiry to a third database storing data indicating if a user of the terminal device is allowed to communicate with the remote system, the generated inquiry comprising a user identifier; in response to a detection that the third response received from the third database comprises data indicating that the user is allowed to communicate with the remote system performing an attachment as described above.

The attachment may be performed by providing at least one certification received from at least one database to the communication system during an establishment of the attachment.

According to a second aspect, a network node implementing an access management function is provided, the network node comprising: at least one processor; at least one memory including computer program code; the at least one memory and the computer program code configured to, with the at least one processor, cause the network node to perform: receive an attachment request to the slice of the mobile communication system from a terminal device; generate an inquiry to a first database storing data indicating if the terminal device is certified to access the slice of the mobile communication system, the generated inquiry comprising an identifier of the terminal device; receive a first response from the first database; generate an inquiry to a second database storing data indicating if the mobile communication system is capable of providing a communication service to the slice for establishing a communication between the terminal device and the remote system; receive a second response from the second database; attach, in response to a detection that the first response comprises data indicating that the user equipment terminal device is certified to access the slice of the mobile communication system and the second response comprises data indicating that the mobile communication system is capable of providing a communication service to the slice for establishing the communication between the terminal device and the remote system, the terminal device to the slice of the mobile communication system for communicating with the remote system.

The network node may further be configured to, prior to attaching the terminal device to the slice of the mobile communication system: determine if an end-user certification is needed for attaching the terminal device to the slice of the mobile communication system. Moreover, the network node may further be configured to, in response to a detection that the end-user certification is needed, perform: generate an inquiry to a third database storing data indicating if a user of the terminal device is allowed to communicate with the remote system, the generated inquiry comprising a user identifier; perform, in response to a detection that the third response received from the third database comprises data indicating that the user is allowed to communicate with the remote system, an attachment as described above.

The network node may further be configured to perform the attachment by providing at least one certification received from at least one database to the communication system during an establishment of the attachment.

According to a third aspect, a computer program product for attaching a terminal device to a slice of a mobile communication system for communicating with a remote system is provided which computer program product, when executed by at least one processor, cause a network node to perform the method as described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically a slicing concept in which the present invention may be applied to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
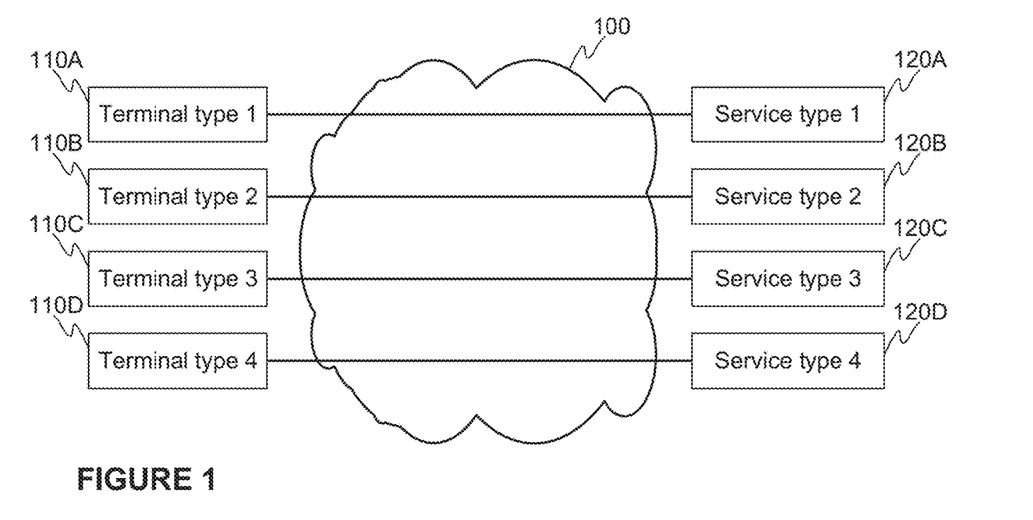

At least some embodiments of the present invention are especially applicable in a communication network based on a so-called network slicing concept as schematically illustrated in FIG. 1. A network slicing refers to an implementation in which a physical infrastructure of a telecommunication network 100 is shared between virtual logical networks created on a top of the physical infrastructure. In that manner it is possible to establish an independent set of logical network functions for each virtual network to enable communication between predetermined types of subscribers (referred with 110A-110D in FIG. 1) and services (referred with 120A-120D in FIG. 1) dedicated to the subscriber types. In the described manner it is possible to define network performance parameters and functions optimal to each use case. As regards to the non-limiting example of FIG. 1 it may be arranged that a first service type 120A relates to multimedia delivery to a terminal device type 1 whereto a requirement for a communication service, and thus to the corresponding slice, is a broadband communication. On the other hand, a second service type 120B may relate to so-called IoT communication which means that a significant amount of resources of a mobile communication network 100 shall be allocated to this slice, since an amount of communication may be huge. Still further, in a third service type 120C an essential feature is that a latency in the communication is low, which may e.g. relate to a communication of connected vehicles, and for that reason the slice in question may be harnessed to provide low latency communication service. In at least some embodiment, one slice may be reserved for other service types, as is referred with 120D. In the described manner, resources of the mobile communication network 100 may be optimally directed according to the service needs and, in that manner, allowing the telecom operators to serve the subscribers in a better way. A non-limiting example of a communication system implementing the slicing concept is so-called 5G communication network system.

Figure 2:
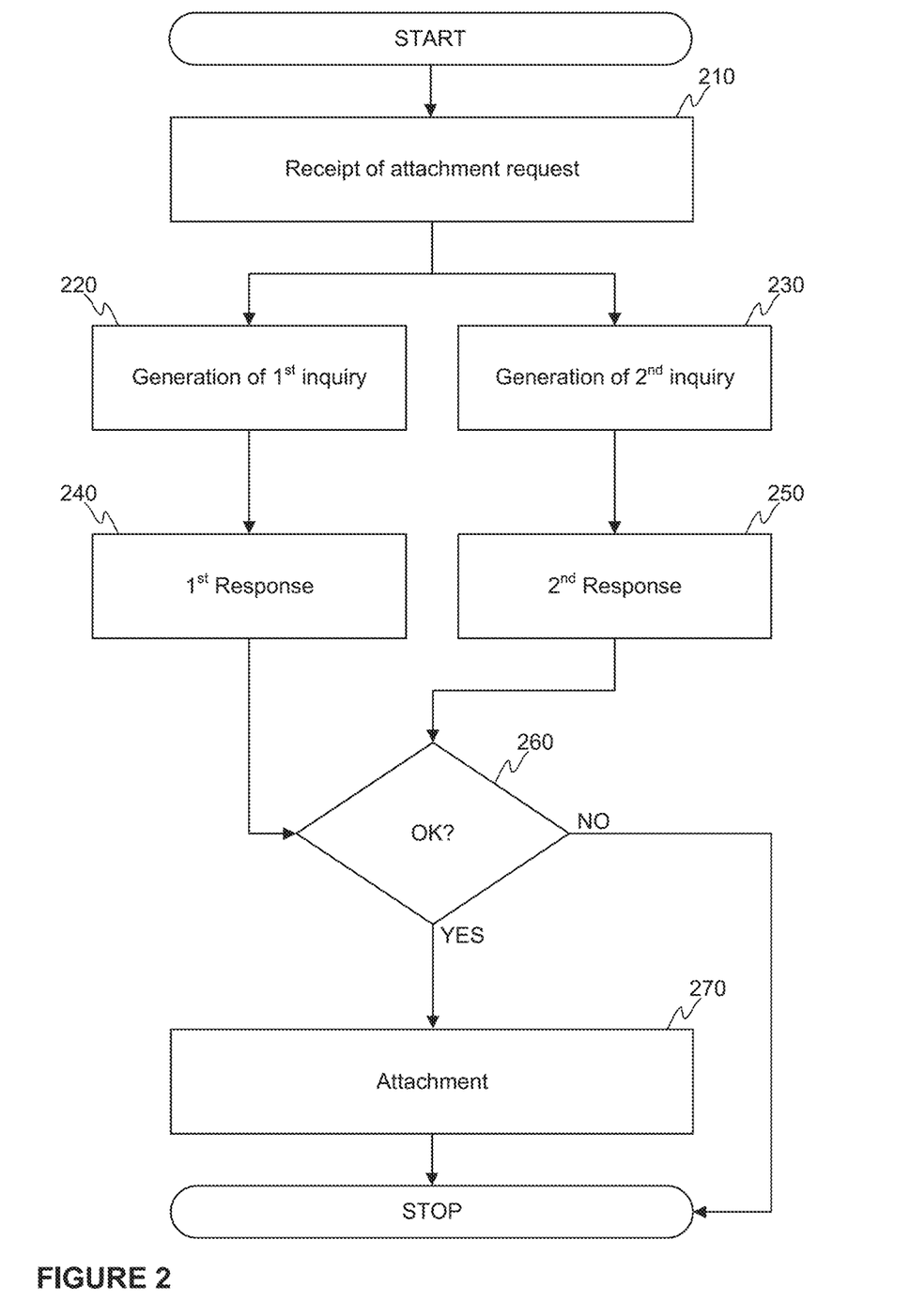
FIG. 2 illustrates schematically a method according to an embodiment of the invention.

The above described communication environment established with a sliced communication network may emphasize an importance of selecting an optimal slice for a certain terminal device. For that purpose a matching of a capability of the terminal device with the communication network 100 shall be done in a sophisticated way in order to find an optimal slice for providing a service to the terminal device. An example of an attachment procedure to an optimal network slice according to an embodiment of the invention is schematically illustrated in FIG. 2 wherein a communication connection is established between a terminal device and a remote system over a mobile communication system. A non-limiting example of an application area may e.g. be that a user of the terminal device is arranged to control a remote system, such as a welding robot, over a slice of the mobile communication system and needs attachment to the slice in question.

In the method for attaching a terminal device to a slice of a mobile communication system for communicating with a remote system an entity executing an access management function receives an attachment request 210 to the slice of the mobile communication network from a terminal device in order to establish a communication connection between the terminal device and the remote system. The slice to which the attachment is requested may be defined in the terminal device or in a subscriber module or in an application used for generating the request, or alternatively the attachment request may comprise data identifying the service, such as the remote system, into which it requests access and the access management system may be arranged to define the slice over which the remote system is accessible. The entity configured to execute the access management function in the mobile communication system may be a network node dedicated to performing the function, such as a server device or a network management entity. Alternatively or in addition, the entity may be implemented as a distributed computing environment, such as a cloud computing environment, established with a plurality of computing devices. The entity may be controlled by the telecom operator managing the mobile communication system or it may be any other party, such as the one providing the service into which the terminal device is willing to access through the attachment request. In response to the receipt of the attachment request 210 the access management function may be configured to generate 220 a first inquiry to a first database storing data indicating if a device requesting the attachment is certified to access the slice of the mobile communication system. The generated inquiry may comprise an identifier of the terminal device. Additionally, the access management function may be configured to generate 230 a second inquiry to a second database storing data indicating if the mobile communication system is capable of providing a communication service to the slice for establishing a communication between the terminal device and the remote system. The number of inquiries may not only be limited to these two as will be described. Moreover, in FIG. 2 it is illustrated that the first and the second inquiries are generated 220, 230 at the same time, but the present invention is not limited only to that kind of implementation, but the inquiries may be generated so that they are performed simultaneously at least in part or consecutively to each other.

As regards to the first inquiry the access management function may generate it by obtaining the identifier of the terminal device from the attachment request, which may be configured to carry data representing the identifier. A non-limiting example of an applicable identifier of the terminal device may be IMEI (International Mobile Equipment Identity). Moreover, the access management function may be configured to include it to the first inquiry and transmit it to a first database storing data indicating if a device is certified to access the slice of the mobile communication system to which the attachment is requested. In response to a receipt of the first inquiry the first database may be configured to obtain information from the database with a query in which the obtained identifier is a parameter. The database may be configured to return an indication as a first response which is received 240 in the access management function, if the terminal device is certified or not with respect to the slice to which the attachment is requested to. According to the present invention the access management function may be configured to deliver the response to the terminal device especially in case when the response is positive i.e. the terminal device is indicated to be certified with respect to the slice in question.

As regards to the second inquiry the access management function may generate it e.g. in response to the receipt of the attachment request 210 from the terminal device, or alternatively e.g. in response to a receipt of such a request from the terminal device. The terminal device may e.g. be configured to generate such a request in response to a receipt of the acknowledgement with respect to the first inquiry from the access management function. The second inquiry may be generated 230 to a second database storing data indicating if the mobile communication system into which the present invention is implemented to is capable of providing a communication service to the slice into which the attachment is requested 210 in order to establish a communication between the terminal device and the remote system. The second inquiry may carry data indicating an identifier of the slice, for example. The second database may be configured to store data disclosing status of certifications of the communication system e.g. with respect to each slice. In other words, the certifications may be granted for the slices in response to predetermined testing procedures performed to the slice or slices in question. In response to the receipt of the second inquiry the second database may be configured to obtain information from the second database with a query in which e.g. the identifier of the slice is used as a parameter. The database may be configured to return an indication as a second response which is received 250 in the access management function, if the slice of the communication system, or any similar network entity, is certified or not. According to the present invention the access management function may be configured to deliver the response to the terminal device especially in case when the response is positive i.e. the terminal device is indicated to be certified with respect to the slice in question.

In the above it is indicated that both the first response from the first database and the second response from the second database are delivered to the terminal device in response to receipts of those especially in a situation when the responses comprise a positive indication on a capability of the terminal device and on a capability of the slice of the communication system into which the attachment is requested to. Alternatively, it may be arranged that the access management function is configured to receive both the responses before transferring any information to the terminal device. In this kind of embodiment the access management function may be configured to generate one acknowledgement to the terminal device in order to indicate at least one of the following: both responses give a positive indication on the capability or only one of them or none of them. In FIG. 2 a detection of the capability of the terminal device and the capability of the slice is indicated with step 260. As said, the detection may be performed in accordance with information received in the first and the second responses.

In response to a detection that both the terminal device and the slice of the communication system fulfil the requirements, i.e. are certified, the terminal device may be configured to perform an attachment 270, controlled by the access management function, to the slice in question and in that manner to be communicatively coupled to the remote system as requested in the attachment request 210. On the other hand, if it is detected that at least one of the responses indicate that the certification in question is not acceptable, i.e. does not meet a requirement, it may cause that the communication connection cannot be established and the attachment 270 is not performed to the slice.

Figure 3:
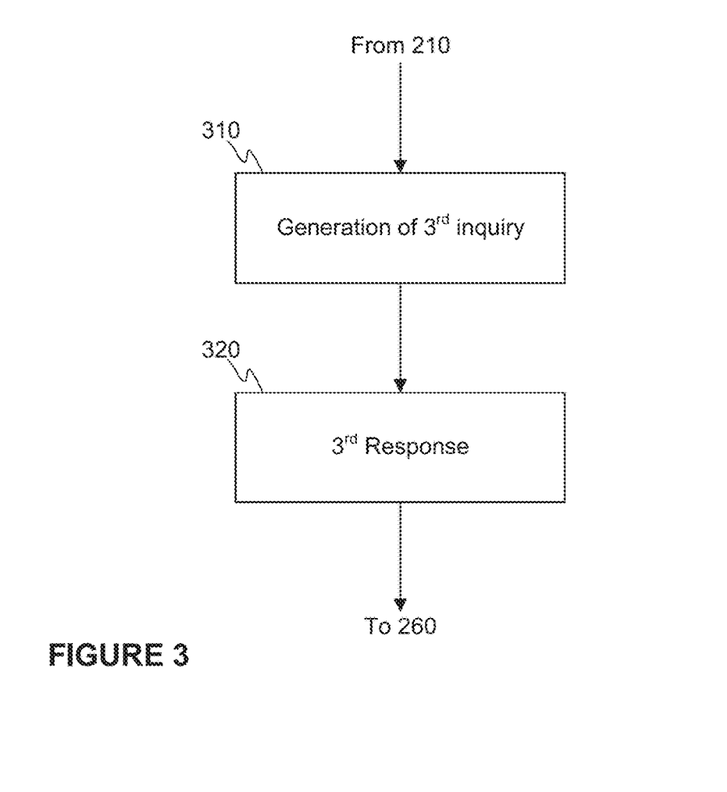
FIG. 3 illustrates schematically further aspects of a method according to an embodiment of the invention.

In a further embodiment of the invention at least one further criterion may be set for allowing the attachment. Namely, in addition to the criteria set for the terminal device and the slice of the mobile communication system user related aspects may be taken into account in the decision making if the attachment to the slice in question shall be done in order to establish a communication connection between the terminal device and the remote system. The user related aspects may refer to, but are not limited to, one or more requirements set for a user of the remote system. For example, if the remote system is a welding robot as mentioned, a requirement for the user of the terminal device may be that he/she is a certified to use welding robot, such as e.g. has a welding capability certification. In order to perform a capability check with respect to a user willing to utilize the remote system a procedure as schematically illustrated in FIG. 3 may be performed simultaneously at least in part or consecutively to at least one other capability determination e.g. with respect to the terminal device and/or to the communication system. In step 310 an inquiry, referred with $3^{rd}$ inquiry, is generated 310 towards a third database storing data indicating at least one capability of one or more users with respect to at least one service accessible over the slice in question. The service refers to the remote system arranged to perform a predetermined task. The inquiry may carry an identifier of the user who is willing to access to the remote system. The identifier may e.g. be a subscriber identity or ever some biometric identifier, such as a fingerprint or a scanned image of a user iris, as some non-limiting examples. The database may be configured to obtain the identifier from the inquiry and to perform a search in the database to find capabilities, e.g. expressed as certifications, of the user and generate a response, aka $3^{rd}$ response, to the inquirer, such as to the access management function wherein the response is received 320. The access management function may be configured to perform the same operation to the response as to the other responses, wherein at least one outcome may be an information if each of the plurality of capability determinations generate a positive result for making a decision to attach to the slice in question.

Figure 4:
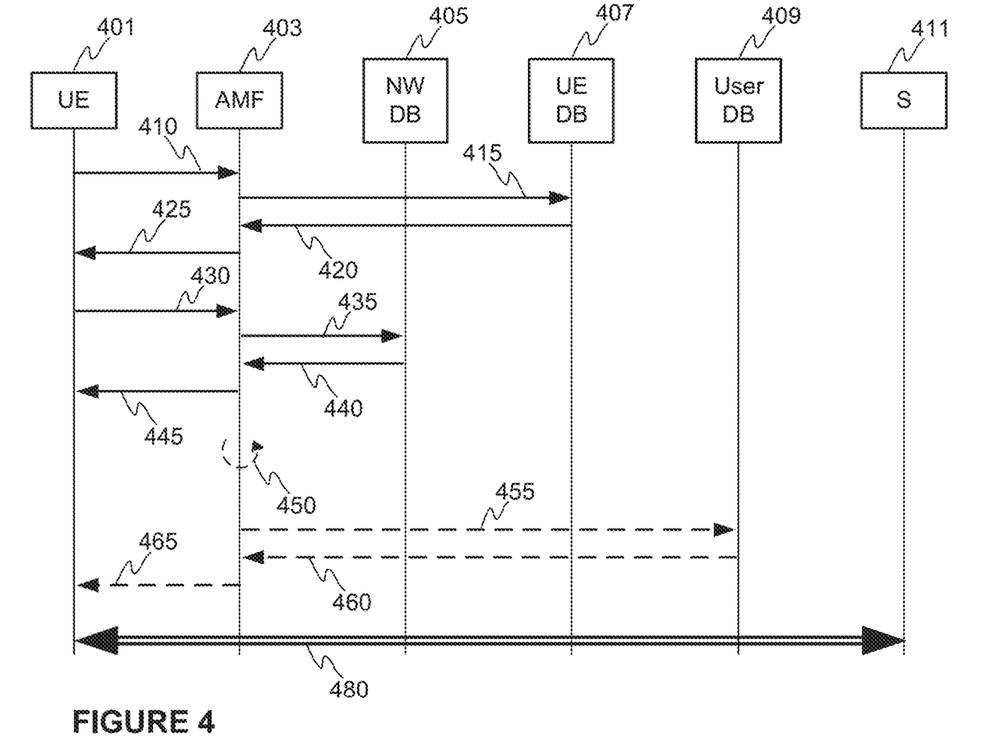
FIG. 4 illustrates schematically an embodiment of the invention in the form of a signal flow diagram.

Next, signaling relating to the present invention according to an embodiment is schematically illustrated in FIG. 4. FIG. 4 illustrates the signaling between the following entities: a terminal device 401, an access management function 403, a first database 405, a second database 407, a third database 409, a remote system 411. For sake of clarity it is worthwhile to mention that the access management function 403 shall be understood as an entity implementing the service management function 403 in the manner as described. The entity may e.g. be a network node for managing at least in part of a communication network 100, such as Mobility Management Entity (MME) in a mobile communication network. Moreover, the remote system 411 shall be understood in a broad manner to refer to any entity, such as to a device, to a system or to any similar entity, which is accessible over a slice in question. The signaling may be initiated with an attach request signal 410, or any similar signal, by means of which the terminal device 401 may inform an access management function 403 that the terminal device 401 intends to access the remote system 411. The access management function 403 may determine necessary pieces of information from the request 410 and may be arranged to generate a first inquiry 415 to a first database 407 storing data indicating if the terminal device 401 is certified to access a slice of the mobile communication system needed for accessing the remote system 411. The first 407 database performs the inquiry to the data and returns a response 420, which may be delivered to the terminal device 401 with a signal 425. In the non-limiting example as illustrated in FIG. 4 the terminal device may generate another request (indicated with arrow 430 in FIG. 4) to the access management function 403 which may cause the access management function 403 to generate a second inquiry 435 to a second database 405 storing data indicating if the mobile communication system is capable of providing a communication service to the slice for establishing a communication between the terminal device 401 and the service 411. In the non-limiting embodiment as schematically illustrated in FIG. 4 the second inquiry 435 may be initiated in response to a receipt of the other request 430. In another embodiment of the invention the second inquiry 435 may be initiated in response to a receipt of the attach request signal 410 in the manner as already described. The second database 405 may generate a response 440 to the access management function 403 which may inform the terminal device 401 that the mobile communication system is capable of providing a communication service to the slice with a signal 445. As already mentioned if the present invention is implemented so that a decision with respect to an access to the remote system 411 over the slice in question is performed with the two described inquiries, the access management function 403 may be arranged to generate necessary notifications to one or more entities, such as to the terminal device 401 and to the remote system 411 as well as to the mobile communication system in general providing the communication service to the slice in question, that the attachment, and, hence, the access, may be established. This is indicated with the arrow 480 in FIG. 4. According to another embodiment of the invention the access management function may be arranged, e.g. in response to receipts of the responses from the first database 407 and the second database 405, to determine if it shall perform further inquiries (this is indicated with arrow 450 in FIG. 4). The determination may refer to an inquiry of the piece of information from data storage accessible to the access management function. In response to an outcome of the determination that at least one further inquiry shall be made the access management function 403 may be arranged to determine the third database 409 into which the inquiry is to be performed and to generate a third inquiry 455 to a third database 409. The third database 409 is arranged to return a response 460 and the access management function 403 may be arranged to generate a signal 465 for informing the terminal device 401 on the outcome of the third inquiry. As described, according to an embodiment of the invention there is needed positive responses to all the inquiries for allowing the access management function 403 to generate necessary notifications to one or more entities, such as to the terminal device 401 and to the remote system 411 as well as to the mobile communication system in general providing the communication service to the slice in question, that the attachment 480, and, hence, the access, may be established. In case there are still further inquiries to be done, e.g. determined at the stage 450, they may also be accomplished prior to the decision-making if the attachment is allowed or not.

According to some other embodiment of the invention the access management function 403 may be arranged to collect all the responses 420, 440, and possibly 460, prior to delivering any of them to the terminal device 401 and it may be arranged to analyse the information indicated in the responses and provide a common acknowledgement to the terminal device 401 representing the responses of all the inquiries 415, 435, 455.

According to some other embodiment of the invention each database 405, 407, 409 may be arranged to associate a certificate, or any similar indicator or security key, to the responses which are delivered to the terminal device 401 through the access management function 403 in one of the manners as described. The association of the certification may be performed if the outcome of the inquiry to the database in question so indicates. Now, when the terminal device 401 receives all these certificates, or similar, it may be arranged to use those for accessing the remote system through the slice. For example, the management entities of the communication network may be arranged to determine if all necessary certificates are in place in the establishment of the attachment e.g. when the terminal device 401 initiates the establishment.

Figure 5:
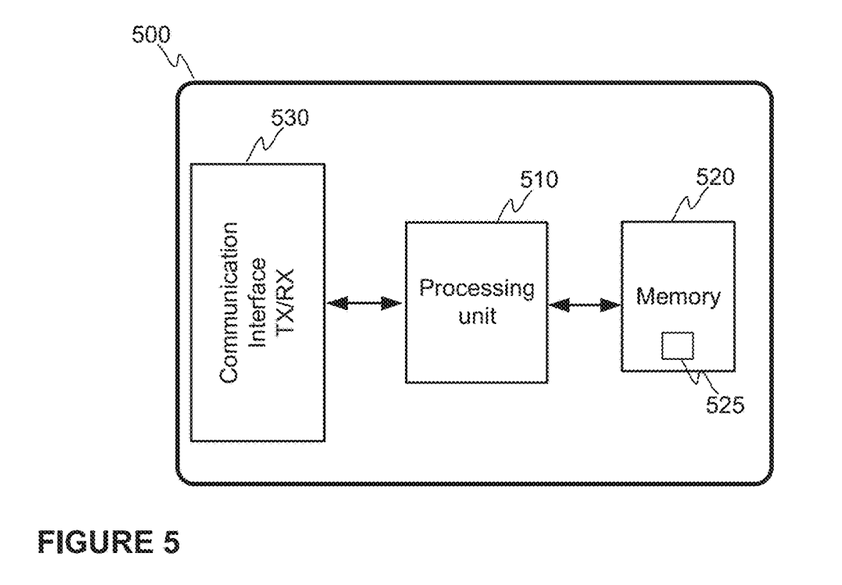
FIG. 5 illustrates schematically a network node according to an embodiment of the invention.

FIG. 5 illustrates, by way of a non-limiting example, main functional parts of a network node 500 arranged to implement an access management function 403 to an embodiment of the invention. The network node 500, such as a server or MME, may be arranged to implement at least some of the method steps according to an embodiment of the invention. The network node 500 may be communicatively coupled to other entities with either wired or wireless communication technology implemented by a communication interface 530 of the network node 500. The communication interface 530 may comprise necessary hardware and software components, such as a modem, for implementing the communication. Furthermore. the network node 500 may comprise a processing unit 510 comprising one or more processors for performing at least some of the method steps as described. The processing unit 510 may be configured to generate the operational instructions causing the network node 500 to operate accordingly by executing portions of computer program code 525 stored in a memory 520 of the network node 500.

In FIG. 5 it is indicated that the network node 500 may be implemented with one device entity configured to perform at least some of the method steps.

However, the implementation of the network node 500 may be performed in a distributed manner by a plurality of separate operating entities or functionalities.

At least some aspects of the present invention may relate to a processor-readable non-transitory storage medium on which is stored one or more sets of processor executable instructions, e.g. in a form of portions of computer program code 525, configured to implement one or more of steps of the method as described. The instructions may also reside, completely or in part, within a main memory, the static memory, and/or within the processor during execution thereof by the network node 500 in question. The term computer-readable medium shall also cover, but is not limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other information archive or set of archives considered to be a distribution medium equivalent to a tangible storage medium.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method, carried out by a network node implementing an access management function, for attaching a terminal device to a slice of a 5G mobile communication system for communicating with a remote system, the 5G mobile communication system managed by a telecom operator, the method comprising:

receiving an attachment request from the terminal device, the attachment request indicating a slice of the 5G mobile communication system to be attached to;

generating a first inquiry to a first database, the first database having data stored therein indicating whether the terminal device is certified to access the slice of the 5G mobile communication system, the generated first inquiry comprising an identifier of the terminal device;

receiving a first response to the first inquiry from the first database;

generating a second inquiry to a second database storing data indicating whether the 5G mobile communication system is capable of providing a communication service to the slice for establishing a communication between the terminal device and the remote system;

receiving a second response to the second inquiry from the second database; and generating, in response to a detection that the first response comprises data indicating that the terminal device is certified to access the slice of the 5G mobile communication system and the second response comprises data indicating that the 5G mobile communication system is capable of providing a communication service to the slice for establishing the communication between the terminal device and the remote system, a notification at least to the terminal device for establishing an attachment of the terminal device to the slice of the 5G mobile communication system for communicating with the remote system.

2. The method of claim 1, the method further comprising, prior to attaching the terminal device to the slice of the 5G mobile communication system:

determining, by the network node via the access management function, whether an end-user certification is needed for attaching the terminal device to the slice of the 5G mobile communication system.

3. The method of claim 2, the method further comprising, in response to a detection that the end-user certification is needed for attaching the terminal device to the slice of the 5G mobile communication system, steps of:

generating a third inquiry to a third database storing data indicating whether a user of the terminal device is allowed to communicate with the remote system, the generated inquiry comprising a user identifier, wherein the attachment of the terminal device to the slice of the 5G mobile communication system is conditioned on a result of the third inquiry indicating that the user of the terminal device is allowed to communicate with the remote system.

4. The method of claim 1, further comprising: delivering at least one certification received from at least one database to the terminal device for the attachment.

5. A network node implementing an access management function, the network node comprising:

at least one processor;

at least one non-transitory memory having computer program code stored therein;

the computer program code configured to, upon execution by the at least one processor, cause the network node to:

receive an attachment request from a terminal device, the attachment request including information of a slice of a 5G mobile communication system to be attached to, the 5G mobile communication system managed by a telecom operator, generate a first inquiry to a first database, the first database having data stored therein indicating whether the terminal device is certified to access the slice of the 5G mobile communication system, the generated first inquiry comprising an identifier of the terminal device, receive a first response to the first inquiry from the first database, generate a second inquiry to a second database, the second database having data stored therein indicating whether the 5G mobile communication system is capable of providing a communication service to the slice for establishing a communication between the terminal device and the remote system, receive a second response to the second inquiry from the second database, generate, in response to a detection that the first response comprises data indicating that the user equipment terminal device is certified to access the slice of the 5G mobile communication system and the second response comprises data indicating that the 5G mobile communication system is capable of providing a communication service to the slice for establishing the communication between the terminal device and the remote system, a notification at least to the terminal device for establishing an attachment of the terminal device to the slice of the 5G mobile communication system for communicating with the remote system.

6. The network node of claim 5, the network node further configured to, prior to attaching the terminal device to the slice of the 5G mobile communication system:

determine whether an end-user certification is needed for attaching the terminal device to the slice of the 5G mobile communication system.

7. The network node of claim 6, the network node further configured to, in response to a detection that the end-user certification is needed:

generate a third inquiry to a third database, the third database having data indicating whether a user of the terminal device is allowed to communicate with the remote system, the generated inquiry comprising a user identifier, wherein the attachment of the terminal device to the slice of the 5G mobile communication system is conditioned on a result of the third inquiry indicating that the user of the terminal device is allowed to communicate with the remote system.

8. The network node of claim 5, wherein the network node is further configured to:

deliver at least one certification received from at least one database to the terminal device for the attachment.

9. A non-transitory computer-readable medium on which is stored a computer program for attaching a terminal device to a slice of a 5G mobile communication system for communicating with a remote system, the 5G mobile communication system managed by a telecom operator, wherein said computer program, when executed by at least one processor of a network node, causes the network node to perform the method according to claim 1.

10. The method of claim 2, further comprising: delivering at least one certification received from at least one database to the terminal device for the attachment.

11. The method of claim 3, further comprising: delivering at least one certification received from at least one database to the terminal device for the attachment.

12. The network node of claim 6, wherein the network node is further configured to:

deliver at least one certification received from at least one database to the terminal device for the attachment.

13. The network node of claim 7, wherein the network node is further configured to:

deliver at least one certification received from at least one database to the terminal device for the attachment.

14. A non-transitory computer-readable medium on which is stored a computer program for attaching a terminal device to a slice of a 5G mobile communication system for communicating with a remote system, the 5G mobile communication system managed by a telecom operator, wherein said computer program, when executed by at least one processor of a network node, causes the network node to perform the method according to claim 2.

15. A non-transitory computer-readable medium on which is stored a computer program for attaching a terminal device to a slice of a 5G mobile communication system for communicating with a remote system, the 5G mobile communication system managed by a telecom operator, wherein said computer program, when executed by at least one processor of a network node, causes the network node to perform the method according to claim 3.

16. A non-transitory computer-readable medium on which is stored a computer program for attaching a terminal device to a slice of a 5G mobile communication system for communicating with a remote system, the 5G mobile communication system managed by a telecom operator, wherein said computer program, when executed by at least one processor of a network node, causes the network node to perform the method according to claim 4.

17. A non-transitory computer-readable medium on which is stored a computer program for attaching a terminal device to a slice of a 5G mobile communication system for communicating with a remote system, the 5G mobile communication system managed by a telecom operator, wherein said computer program, when executed by at least one processor of a network node, causes the network node to perform the method according to claim 10.

18. A non-transitory computer-readable medium on which is stored a computer program for attaching a terminal device to a slice of a 5G mobile communication system for communicating with a remote system, the 5G mobile communication system managed by a telecom operator, wherein said computer program, when executed by at least one processor of a network node, causes the network node to perform the method according to to claim 11.

* * * * *